(12) United States Patent
Kimball et al.

(10) Patent No.: US 11,474,216 B2
(45) Date of Patent: Oct. 18, 2022

(54) SINGLE-PHOTON AVALANCHE DIODE-BASED TIME-OF-FLIGHT SENSOR WITH TWO MODES OF OPERATION

(71) Applicant: Cirrus Logic International Semiconductor Ltd., Edinburgh (GB)

(72) Inventors: Eric Kimball, Austin, TX (US); Kyriaki Fotopoulou, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 360 days.

(21) Appl. No.: 16/812,920

(22) Filed: Mar. 9, 2020

(65) Prior Publication Data

US 2021/0088634 A1 Mar. 25, 2021

Related U.S. Application Data

(60) Provisional application No. 62/903,323, filed on Sep. 20, 2019.

(51) Int. Cl.
| | | |
|---|---|---|
| *G01J 1/44* | (2006.01) | |
| *G01S 7/4863* | (2020.01) | |
| *G01S 17/10* | (2020.01) | |
| *G01S 7/497* | (2006.01) | |
| *G01S 7/489* | (2006.01) | |

(52) U.S. Cl.
CPC .............. *G01S 7/4863* (2013.01); *G01J 1/44* (2013.01); *G01S 7/489* (2013.01); *G01S 7/497* (2013.01); *G01S 17/10* (2013.01); *G01J 2001/4466* (2013.01)

(58) Field of Classification Search
CPC .. G01J 1/44; G01S 17/10; G01S 17/02; G01S 17/04; G01S 17/06; G01S 7/48; G01S 7/49; H01L 31/107
USPC .............................................. 250/214 R, 221
See application file for complete search history.

(56) References Cited

U.S. PATENT DOCUMENTS 9,823,123 B2 * 11/2017 Tsai ......................... G01J 1/44

* cited by examiner

*Primary Examiner* — Que Tan Le
(74) *Attorney, Agent, or Firm* — Jackson Walker L.L.P.

(57) ABSTRACT

A method may include operating a single-photon avalanche diode (SPAD) in a first mode to determine a light intensity level associated with the SPAD, operating the SPAD in a second mode wherein a reverse bias voltage is applied in the second mode to bias the SPAD beyond its breakdown voltage, such that the SPAD operates in a detection mode, and determining a magnitude of the bias voltage applied to the SPAD in the second mode based on the light intensity level determined in the first mode.

36 Claims, 2 Drawing Sheets

SINGLE-PHOTON AVALANCHE DIODE-BASED TIME-OF-FLIGHT SENSOR WITH TWO MODES OF OPERATION

RELATED APPLICATION

The present disclosure claims priority to U.S. Provisional Patent Application Ser. No. 62/903,323, filed Sep. 20, 2019, which is incorporated by reference herein in its entirety.

FIELD OF DISCLOSURE

The present disclosure generally relates to a sensor system and a method for sensing, in particular a single-photon avalanche diode (SPAD)-based sensor and an associated control system for the SPAD-based sensor.

BACKGROUND

A single-photon avalanche diode (SPAD) is often implemented on a device with a p-n junction biased beyond its breakdown region. The high reverse bias voltage generates a sufficient electric field such that a single photon can create an electron-hole pair in the depletion layer of the device via impact ionization, the creation of which can trigger a self-sustaining avalanche. This single photon detection mode of operation is often referred to as the "Geiger mode." A sensitive SPAD may often be paired with a laser or other light-emitting device to build a range finding system in time-of-flight (ToF) systems. The laser or light-emitting device may be pulsed and the time statistics of avalanches in a detector array of SPAD devices may be used to determine the distance to an object based on the speed of light.

A limiting factor in the use of SPADs is the recovery time after a SPAD triggers. Once a SPAD has been triggered, the voltage across it has to be reset to the edge of breakdown in order to stop the avalanche. The voltage is required to stay low long enough for all the stray carriers to recombine, or the device could retrigger with an after-pulse as soon as the reverse bias excess voltage is restored. The time period for maintaining this lower voltage is referred to as the "quench time." This quench time limits the maximum rate at which photons can be detected. The quench time or reset time may set the upper end of the number of photons that can be detected. For example, in a situation where the impinging light power is high enough that after the SPAD quench is complete the system instantaneously detects a photon, the maximum rate that can be detected will be $1/T_{quench}$ (where $T_{quench}$ is the quench time). Assuming a 5-20 nanosecond quench time as a possible range, a maximum count rate for such a sensor system may be in the range of 50-200 MHz.

The quenching operation may be performed either actively or passively, but passive quenching may be relatively slow and can suffer from extended dead time. Examples of active and passive quenching circuits can be found in "185 MHz Count Rate, 139 dB Dynamic Range Single-Photon Avalanche Diode with Active Quenching Circuit in 130 nm CMOS Technology," Eisele, et. al., IISW 2011, June 2011.

An example of a SPAD array having improved range of operation may be shown in U.S. Patent Application Publication No. 2016/0064579, wherein different SPADs in an array have different areas open to receiving incident light, thereby modifying the range that the array can cover without saturating. However, such a solution can require an increased area requirement for the device.

Accordingly, it may be desirable to provide a SPAD and/or SPAD array having an improved range of operation without the disadvantages of traditional approaches to SPAD devices described above.

SUMMARY

In accordance with the teachings of the present disclosure, certain disadvantages and problems associated with traditional SPAD-based devices may be reduced or eliminated.

In accordance with embodiments of the present disclosure, a method may include operating a single-photon avalanche diode (SPAD) in a first mode to determine a light intensity level associated with the SPAD, operating the SPAD in a second mode wherein a reverse bias voltage is applied in the second mode to bias the SPAD beyond its breakdown voltage, such that the SPAD operates in a detection mode, and determining a magnitude of the bias voltage applied to the SPAD in the second mode based on the light intensity level determined in the first mode.

In accordance with these and other embodiments of the present disclosure, a system may include a single-photon avalanche diode (SPAD), control circuitry coupled to the SPAD and configured to operate the SPAD in a first mode to determine a light intensity level associated with the SPAD, operate the SPAD in a second mode wherein a reverse bias voltage is applied in the second mode to bias the SPAD beyond its breakdown voltage, such that the SPAD operates in a detection mode, and determine a magnitude of the bias voltage applied to the SPAD in the second mode based on the light intensity level determined in the first mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
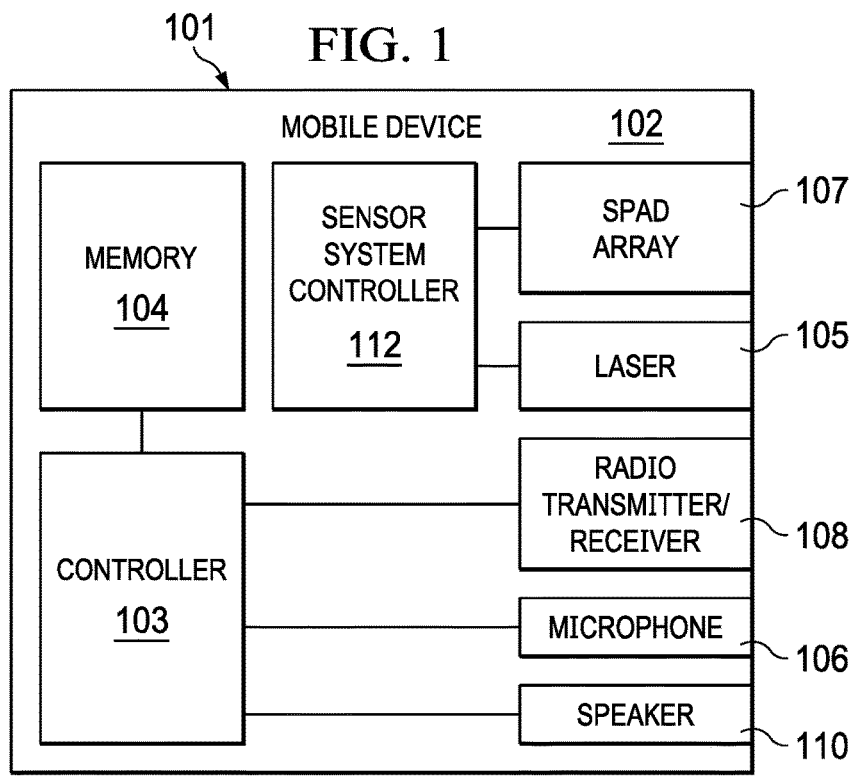
FIG. 1 illustrates a block diagram of selected components of an example mobile device, in accordance with embodiments of the present disclosure.

FIG. 1 illustrates a block diagram of selected components of an example mobile device, in accordance with embodiments of the present disclosure. As shown in the figure, mobile device 102 may comprise an enclosure 101, a controller 103, a memory 104, a laser 105, a microphone 106, an array of SPAD devices 107, a radio transmitter/receiver 108, a speaker 110, and a sensor system controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102. While FIG. 1 illustrates a mobile device, it will be understood that the illustrated systems may be utilized in other device types, for example user-interactive display technologies, automotive computing systems, etc.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, 5G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Laser 105 may comprise any suitable light-emitting device configured to emit coherent light at one or more desired wavelengths, in the visible wavelengths, invisible wavelengths, or both. However, it is understood that any suitable light-emitting device may be used as an alternative to or in addition to laser 105.

SPAD array 107 may comprise any suitable number (e.g., one or more) or configuration (e.g., linear area, two-dimensional array, etc.) of SPAD devices. Each SPAD device may comprise a solid-state photodetector in which a photon-generated carrier (via the internal photoelectric effect) may trigger a short-duration but relatively large avalanche current (e.g., via a mechanism called impact ionization, whereby carriers, either electrons and/or holes, are accelerated to high kinetic energies through a large potential gradient or voltage).

Sensor system controller 112 may be housed within enclosure 101, may be communicatively coupled to laser 105, SPAD array 107, and/or controller 103 (e.g., via an Inter-Integrated Circuit (I2C) interface), and may include any system, device, or apparatus configured to control laser 105 and/or receive electronic signals indicative of light detected by SPAD array 107. Accordingly, sensor system controller 112 may include any system, device, or apparatus configured to interpret and/or execute program instructions and/or process data, and without limitation may include and/or may be implemented in whole or part by, a microprocessor, microcontroller, digital signal processor (DSP), application specific integrated circuit (ASIC), or any other digital or analog circuitry configured to interpret and/or execute program instructions and/or process data.

Laser 105, SPAD array 107, and sensor system controller 112 may be arranged and/or implemented as part of a time-of-flight (ToF) range-finding system, for example to determine the distance from mobile device 102 to an object such as a face of a user of mobile device 102.

Figure 2:
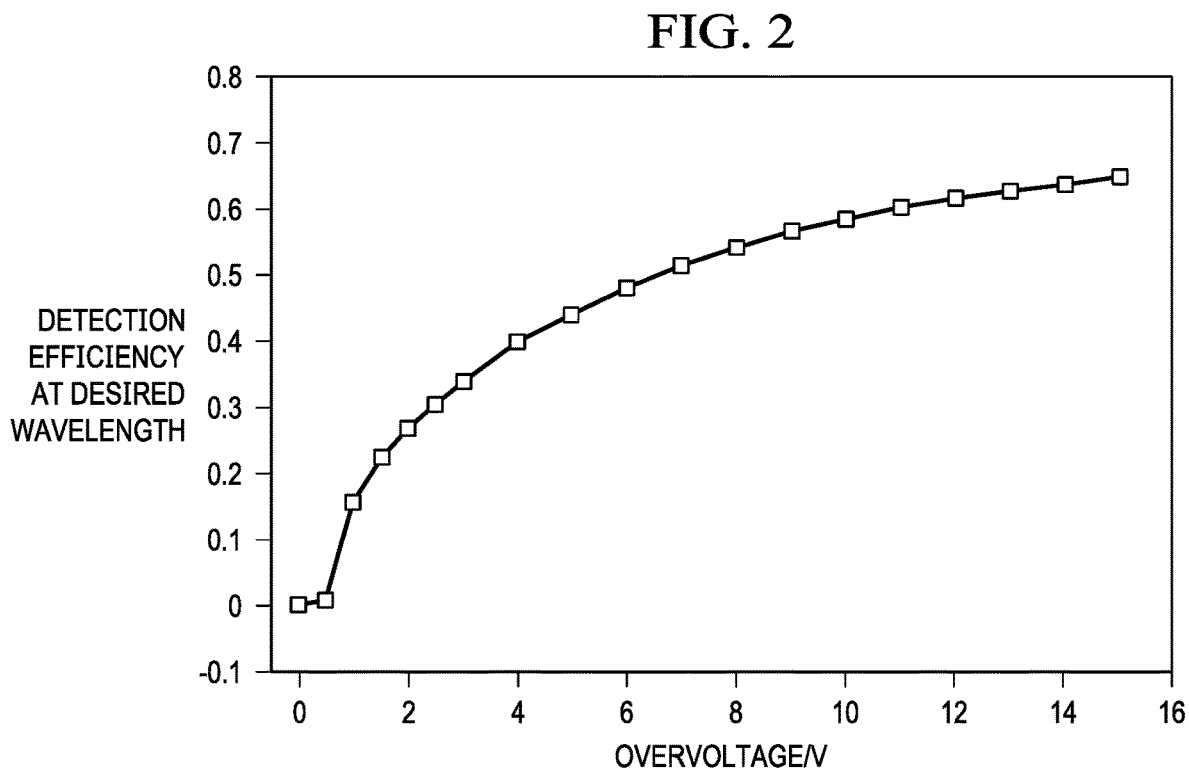
FIG. 2 illustrates an example graph depicting an example probability of detecting a photon versus overvoltage for a SPAD device, in accordance with embodiments of the present disclosure.

FIG. 2 illustrates an example graph depicting an example probability of detecting a photon versus overvoltage for a SPAD device (e.g., a SPAD device integral to SPAD array 107), in accordance with embodiments of the present disclosure. As shown in FIG. 2, the sensitivity of a SPAD device may be modulated by modulating an excess voltage across the SPAD device. In particular, a probability of detecting a photon (PDP) may increase monotonically with increased detection voltage, where PDP at a zero excess voltage is zero.

Figure 3:
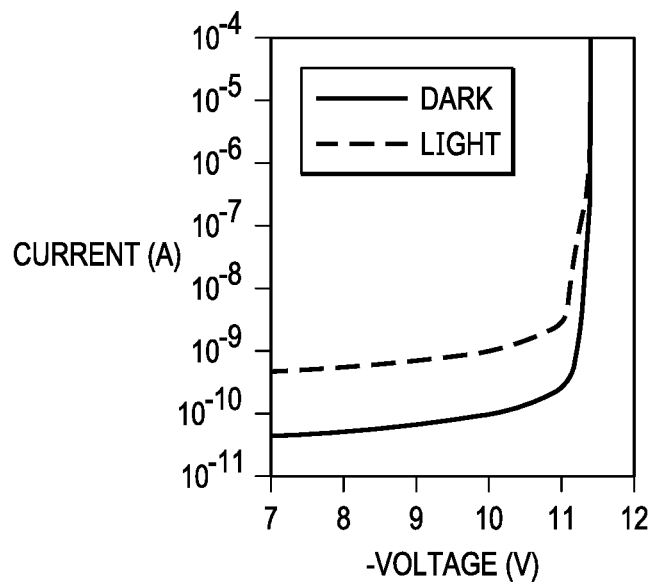
FIG. 3 illustrates an example graph depicting an example current versus reverse-bias voltage relationship for a SPAD device, in accordance with embodiments of the present disclosure.

FIG. 3 illustrates an example graph depicting an example current versus reverse-bias voltage relationship for a SPAD device, in accordance with embodiments of the present disclosure, As shown in FIG. 3, a SPAD device may be operated below its breakdown voltage, in its linear region of operation. In the example plot shown in FIG. 3, the output current of a SPAD device is shown for light conditions (e.g., plot in dashed line) and dark conditions (e.g., plot shown in solid line), with the linear region of operation being illustrated for an applied voltage in the range of approximately −7 to approximately −11 volts.

In accordance with embodiments of the present disclosure, a SPAD device may be operated in two modes in order to provide a SPAD sensor system having improved efficiency of operation as compared to existing approaches. A SPAD device may be operated in two modes:

A first mode in which the SPAD device is operated in the linear region, to determine a light intensity level present at the SPAD device, and A second mode where the SPAD device is operated in a detection mode or Geiger mode, where a voltage is applied to the SPAD device to drive the SPAD device into the breakdown region.

To operate in the first mode, a reverse-biased voltage may be applied to the SPAD device below the magnitude of the breakdown voltage level, such that the SPAD device may operate in a reverse-biased linear mode region. To operate in the second mode, a magnitude of a reverse-biased voltage applied may be selected based on a light intensity level detected by the SPAD device in the first mode. As the PDP of the SPAD device may increase with increasing voltage, accordingly by increasing the voltage applied to the SPAD device, the operation of the SPAD device can be optimized for the light intensity level available, thereby improving the overall operation of the sensor system.

For example, to avoid device saturation, a low excess voltage may be applied for a high light intensity level, and a high excess voltage may be applied for a low light intensity level. An entire SPAD array 107 can be used for detection under any conditions of light intensity, provided that the excess voltage is set correctly.

When operating in the linear region during the first mode, an intensity level of impinging light may be measured by integrating the received current through the SPAD device. By integrating the received current for the amount of time equivalent to a longest round trip delay it is desired to measure, the intensity of the impinging light in a single pass may be determined. The determined intensity may be used to select an excess voltage level to be applied to the SPAD device in the second mode. For example, the determined intensity can be used as an input into a calibrated lookup table (e.g., stored in memory 104) to determine what a desirable excess voltage should be for such light intensity. Once the correct excess voltage is selected, the SPAD device is operated in Geiger mode with the selected voltage, and light statistics can be measured to determine the distance to an object, using any suitable technique.

Figure 4:
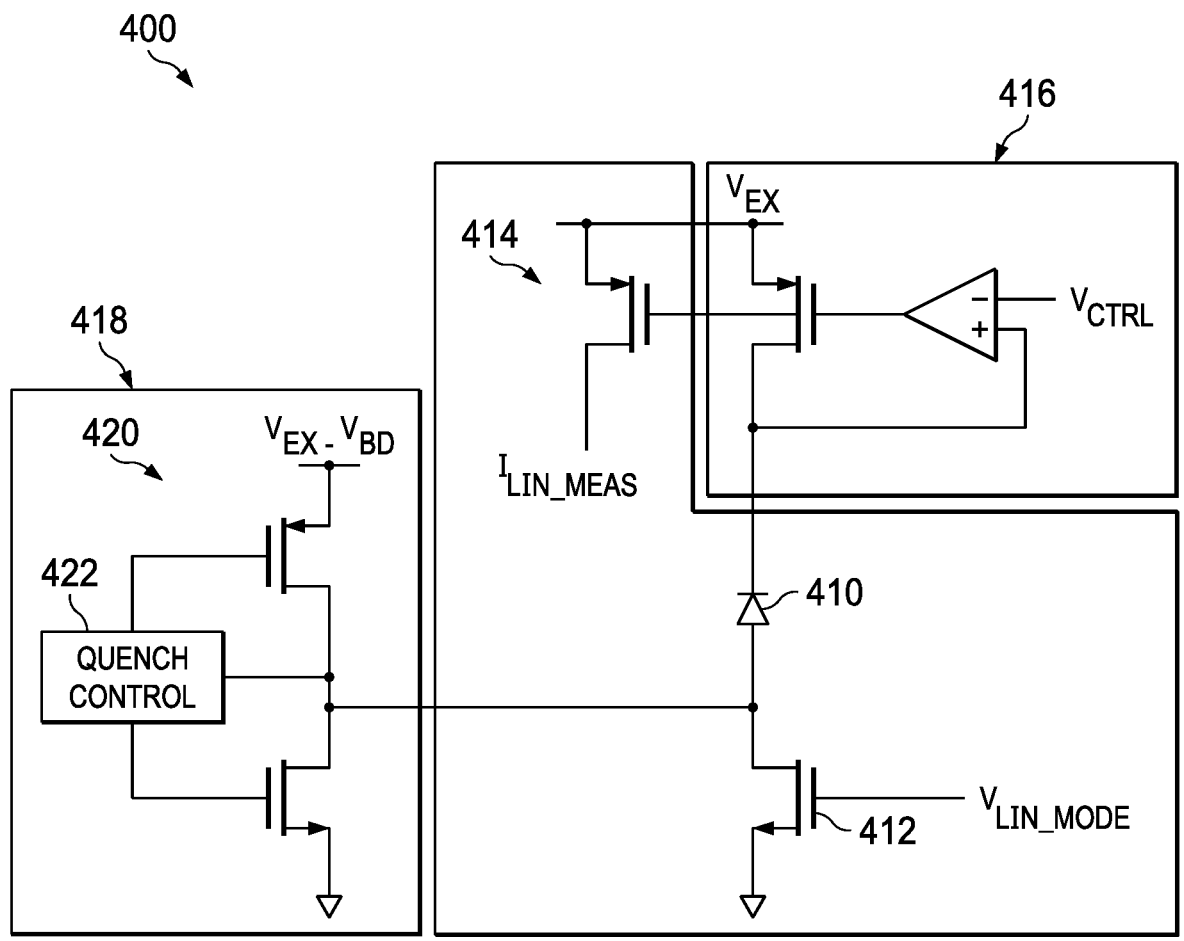
FIG. 4 illustrates a circuit diagram of selected components of an example circuit for operating a SPAD device in two operational modes, in accordance with embodiments of the present disclosure.

FIG. 4 illustrates a circuit diagram of selected components of an example circuit 400 for operating a SPAD device 410 in two operational modes, in accordance with embodiments of the present disclosure. One or more components of example circuit 400 may be implemented by and/or may be integral to sensor system controller 112 of mobile device 102.

As shown in FIG. 4, circuit 400 may comprise a SPAD device 410, the anode of which may be coupled to ground via an NMOS transistor switch 412 controlled by a control input $V_{LIN\_MODE}$ provided to a gate terminal of NMOS transistor switch 412. The cathode of the SPAD device 410 may be coupled with a PMOS current mirror device 414, in order to measure a photoelectric current through SPAD device 410 during the first mode of operation in the linear region of SPAD device 410. In some embodiments, control input $V_{LIN\_MODE}$ may be provided by sensor system controller 112 or another suitable component of mobile device 102.

Circuit 400 may also include a low-dropout regulator LDO 416 coupled to the cathode of SPAD device 410, which may be configured to set the voltages for the first mode (linear mode) and the second mode (Geiger mode) of operation of SPAD device 410. LDO 416 may be controlled by a control input $V_{CTRL}$. In some embodiments, control input $V_{CTRL}$ may be provided by sensor system controller 112 or another suitable component of mobile device 102.

Circuit 400 may further comprise a voltage control circuit 418 coupled to the anode of SPAD device 410. Voltage control circuit 418 may include a CMOS pair device 420 and quench control circuitry 422 as shown in FIG. 4. Voltage control circuit 418 may be supplied from a voltage rail set at an excess voltage $V_{EX}$ minus a breakdown voltage $V_{BD}$ of SPAD device 410. Quench control circuitry 422 may be configured to reduce the diode voltage of SPAD device 410 to its breakdown voltage level after an avalanche event in order to reset SPAD device 410.

In the first mode of operation, SPAD device 410 may be measured in its linear mode. In the first mode, sensor system controller 112 may set $V_{LIN\_MODE}$ high, thus activating (e.g., enabling, turning on, closing, etc.) NMOS transistor switch 412. Further, LDO 416 may set a voltage across SPAD device 410 lower than its breakdown voltage, as a result of sensor system controller 112 setting a desired level of the voltage across SPAD device 410 by appropriately setting control input $V_{CTRL}$. Also in the first mode, a current intensity through SPAD device 410 may be proportional to a light intensity incident upon SPAD device 410. Accordingly, a current $I_{LIN\_MEAS}$ proportional to such light intensity may flow through PMOS current mirror device 414. A suitable current measurement circuit (not shown) of sensor system controller 112 may measure such current $I_{LIN\_MEAS}$.

In the second mode of operation, SPAD device 410 may operate in the Geiger mode, such that a single photon impinging on SPAD device 410 may cause an electron-hole pair to form, which may multiply through an avalanche breakdown process into a very large current, with a probability equal to its probability of detecting a photon (PDP) as described above. In the second mode of operation, sensor system controller 112 may set control input $V_{CTRL}$, to a voltage magnitude equal to the sum of breakdown voltage $V_{BD}$ of SPAD device 410 plus an excess voltage $V_{EX}$, wherein excess voltage $V_{EX}$ is based on the measurement of current $I_{LIN\_MEAS}$ during the first mode of operation. In the second mode of operation, the current through SPAD device 410 may not be directly measured, and PMOS current mirror device 414 may be ignored or disabled. In addition, during the second mode of operation, NMOS transistor switch 412 may be deactivated (e.g., disabled, turned off, opened).

In the second mode of operation, detection of a single photon may be performed by voltage control circuit 418. When an avalanche occurs, the current through SPAD device 410 may increase very quickly, causing the anode voltage of the SPAD device 410 to increase quickly, and voltage control circuit 418 may detect such anode voltage increase as a digital event.

In addition, because SPAD device 410 has avalanched, it can no longer detect a photon, and requires quenching before it can detect the next photon event. Accordingly, quench control circuitry 422 may quench by reducing the voltage across SPAD device 410 to its breakdown voltage $V_{BD}$, so that avalanche current may stop flowing through SPAD device 410, and then resetting SPAD device 410 by decreasing the anode voltage back down to ground after the current has ceased, which may allow SPAD device 410 to again detect photons. Accordingly, the quenching process may begin with a digital detection of a signal edge that may be created by a large current through SPAD device 410 that causes the voltage of the anode of SPAD device 410 to increase. LDO 416 may be configured to ensure that the voltage on the cathode of SPAD device 410 remains stable during the avalanche event. Quench control circuitry 422 may cause the current through SPAD device 410 to cease and reset SPAD device 410. Sensor system controller 112 may count the occurrence of this event, and thus such event may be used by sensor system controller 112 as part of the statistics used to determine when a light pulse returned, which can be used in a time-of-flight system to determine the presence of and/or distance to an object.

In the second mode, excess voltage $V_{EX}$ may be set to be higher than breakdown voltage $V_{BD}$ of SPAD device 410 and in the first mode excess voltage $V_{EX}$ may be set lower than breakdown voltage $V_{BD}$ of SPAD device 410. The level of excess voltage $V_{EX}$ may be set using additional voltage sources (not shown) which may be part of and/or controlled by sensor system controller 112. For example, in some embodiments, excess voltage $V_{EX}$ may be generated using a boost converter coupled from a main system power supply (a system battery) of mobile device 102.

It is understood that other configurations of circuits may be provided to implement the above described method of operation of the SPAD system.

It is understood that the above-described systems and methods may be implemented in a dedicated control module, for example a processing module or DSP. The control module may be provided as an integral part of the sensor system or may be provided as part of a centralized controller such as a central processing unit (CPU) or applications processor (AP). It is further understood that the control module may be provided with a suitable memory storage module for storing measured and calculated data for use in the described processes.

Embodiments may be implemented in a host device, for example a portable and/or battery powered host device such as a mobile computing device (e.g., a laptop or tablet computer), a games console, a remote control device, a home automation controller or a domestic appliance including a domestic temperature or lighting control system, a toy, a machine such as a robot, an audio player, a video player, or a mobile telephone (e.g., a smartphone). It is understood that embodiments may be implemented as part of any suitable human-machine interface system, for example on a home appliance, in a vehicle, and/or an interactive display. In addition, it is understood that embodiments may be implemented as part of a self-driving or collision-avoidance system in a vehicle.

Operating a SPAD device in two modes as described above may provide several advantages.

For example, while traditional SPAD-based systems may determine a light intensity level while in Geiger mode, such approach may lead to longer times to perform an effective measurement, as it would take a number of passes to build up an accurate histogram of the light levels present. Different excess voltages would need to be applied, building up a histogram each time, without knowing if the SPAD device is in its noise floor or is saturated. By contrast, using the linear mode in the first mode of operation as described herein may allow a measurement of light intensity level to be made in a single pass. Once the light intensity level is known from the first mode, the SPAD device can then be operated in the second, Geiger mode with the optimal excess voltage based on ambient light conditions. As the Geiger mode may be more accurate for determining timing resolution, the two-mode system described herein may be able to obtain a more accurate time-of-flight measurement. By determining an optimum excess voltage in linear mode where the noise is lower and device saturation is not an issue, having a SPAD device that is configured to operate in both the linear and breakdown regions may provide advantages of both modes.

In a further aspect, as the intensity of a laser or light-emitting device (e.g., laser 105) may be known by a sensor system, a measurement of light intensity level determined in the first mode of operation may be compared with the known intensity of the laser to determine if the ambient light is too intense for a measurement to be accurate. This may be done by comparing the determined intensity level to a threshold, where the threshold is based on the known intensity level of the laser or light-emitting device. If the ambient light intensity level meets or exceeds the threshold, accordingly a control signal such as an error message or warning flag may be generated for the sensor system control, which may be presented to a user of the device, warning that an accurate measurement cannot be performed in the current conditions. In some embodiments, the threshold may be set to be equivalent to the known intensity level of the laser or light-emitting device.

In some embodiments, the measurement of ambient light intensity level may be synchronized with the operation of the laser or light-emitting device (e.g., laser 105). For example, for a time-of-flight system having a pulsing laser or light-emitting device, the measurement of ambient light intensity level may be coordinated with the pulsing of emitted light. An initial linear or first mode measurement may be taken in the time interval between light pulses, in order to determine the ambient light intensity level, and a further linear or first mode measurement may be taken during a light pulse, to determine the emitted light intensity level.

In some embodiments, an ambient light measurement may be established as a threshold where a received signal having an intensity level above that threshold may be measurable, and a received signal having an intensity level below that threshold would not be measurable. Such a threshold may translate into a distance threshold, that would vary with ambient light, triggering an error when the received signal was below that threshold. It will be further understood that the detection range may be extended through the use of various signal processing techniques. In a further aspect, the threshold may be based on the known intensity level of the light-emitting device, e.g., 50%, 75%, 95% of the known intensity level.

Because the intensity of the laser or light-emitting device is known by the sensor system, and as the operation of a sensor system may determine an intensity of the received pulse and the distance to an object to be measured, the sensor system may be able to combine these values to determine a measurement of the reflectivity of the object. One possible method to determine the reflectivity of an object is based on the following relationship:

Light Intensity Received=(Light Intensity Transmitted)*(Unitless Attenuation Factor which is a Function of the Object's Distance)*(Reflectivity which is a Function of the Object)

The measurement performed in the first mode may provide a measurement of the received light intensity, and the measurement of the second mode may provide the unitless attenuation factor that is a function of the distance to the object. As the transmitted light intensity is known it is possible to calculate or estimate the reflectivity that is a function of the object itself.

Determining the reflectivity of an object may provide additional environmental information which may be used in the operation of an object-detection system. For example, a highly-reflective object may result in an increased probability of errors in an object-detection system, for example a collision-avoidance system in autonomous or automated vehicles or machinery, due to the increased likelihood of interference between different time-of-flight signals. In such a case, the determination of the presence of a highly-reflective object may cause the system to perform additional processing of signals to provide increased accuracy or caution, thereby offsetting any increased probability of error.

In addition, it will be understood that the reflectivity of an object is the same as the reflectance when the angle of incidence for the illumination is perpendicular to the device and the surface is homogeneous. For a small SPAD array, the angle of incidence may not always be perpendicular depending on a field of view. For a field of view of 70 degrees, a chief ray angle may vary from zero degrees to 30 degrees. In addition, the reflectivity of an object is a constant of the material for a given wavelength and it does not vary with distance from the observation point.

For an active illumination system such as a time-of-flight or proximity device, the reflectivity of the scene can be measured using the SPAD device in the linear mode as an ambient light sensor. The intensity information alone provides the reflectivity of the object, provided the transmitted flux is known. Depending on the reflectivity of the object, it may be possible to adjust the excess voltage to tune the PDP for the Geiger mode of the SPAD device. With a more reflective object, a higher level signal may be expected to be incident on the SPAD device, and accordingly the excess voltage on the SPAD device can be lowered, and vice versa.

Measuring a light intensity and extrapolating a reflectivity may provide a way to adjust either the voltage level in the Geiger mode or adjust the intensity of the light in the illumination to compensate for a lower reflectance object.

As a further advantage, operating a SPAD device in two modes as described may allow a detection system to use a higher absolute excess voltage than existing approaches, as the risk is removed of operating in the rapidly rising noise floor that comes with higher excess voltages, because the linear mode measurement provides an estimate of the signal, allowing the detection system to adjust the noise floor higher to a level that is close to the level of the signal but still not exceeding the signal level itself.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
    operating a single-photon avalanche diode (SPAD) in a first mode to determine a light intensity level associated with the SPAD;
    operating the SPAD in a second mode wherein a reverse bias voltage is applied in the second mode to bias the SPAD beyond its breakdown voltage, such that the SPAD operates in a detection mode; and determining a magnitude of the bias voltage applied to the SPAD in the second mode based on the light intensity level determined in the first mode.

2. The method of claim 1, wherein operating the SPAD in the first mode comprises reverse biasing the SPAD in a linear region of operation of the SPAD.

3. The method of claim 2, wherein reverse biasing the SPAD in the first mode of operation of the SPAD comprises applying the reverse bias voltage having a magnitude lower than a breakdown voltage of the SPAD.

4. The method of claim 1, wherein determining the light intensity level associated with the SPAD comprises:
   integrating with respect to time a current flowing through the SPAD during the first mode; and
   determining the light intensity level based on the integration of the current.

5. The method of claim 4, further comprising integrating the current flowing through the SPAD over a defined time period equal or greater to a longest round-trip delay of a photon to be detected by the SPAD.

6. The method of claim 1, wherein the magnitude of the bias voltage applied during the second mode of operation is inversely proportional to the light intensity level determined in the first mode of operation.

7. The method of claim 1, further comprising determining the bias voltage applied during the second mode of operation from a lookup table indexed by light intensity level determined in the first mode of operation.

8. The method of claim 1, wherein the SPAD is coupled to a light-emitting device of a known wavelength and a known light intensity level, and the method further comprises:
   measuring a time-of-flight of a pulse from the light-emitting device during the second mode of operation; and
   determining a distance to an object based on the time-of-flight.

9. The method of claim 8, wherein measuring the time-of-flight of the pulse is based on an occurrence of a current avalanche of the SPAD during the second mode of operation.

10. The method of claim 1, wherein the SPAD is coupled to a light-emitting device of a known wavelength and a known light intensity level, and the method further comprises:
    comparing the light intensity level determined in the first mode with the known light intensity level; and
    generating an indication if the light intensity level determined in the first mode exceeds the known light intensity level.

11. The method of claim 10, wherein the indication comprises one of a warning flag or an error message indicating that ambient light conditions do not allow for accurate detection of light in the second mode of operation.

12. The method of claim 1, wherein the SPAD is coupled to a light-emitting device of a known wavelength and a known light intensity level, and the method further comprises:
    comparing the light intensity level determined in the first mode with the known light intensity level;
    determining a distance to an object in the second mode of operation; and
    determining a reflectivity of the object based on the comparison and the distance.

13. The method of claim 12, further comprising calculating an attenuation factor which is a function of the distance.

14. The method of claim 13, wherein the reflectivity of the object is calculated based on the following relationship:

$$(\text{Reflectivity of Object}) = \frac{(\text{Received Light Intensity})}{(\text{Transmitted Light Intensity}) \cdot (\text{Attenuation Factor that is a function of Distance})}$$

15. The method of claim 1, further comprising applying a reduced reverse bias voltage to the SPAD after an avalanche event has occurred in the SPAD.

16. The method of claim 15, wherein the reduced reverse bias voltage is approximately equal to a breakdown voltage of the SPAD.

17. The method of claim 1, wherein:
    the reverse bias voltage during the first mode of operation is lower than a reverse breakdown voltage of the SPAD in order to operate the SPAD in a reverse-biased linear region of the SPAD; and
    the reverse bias voltage during the second mode of operation is greater than the breakdown voltage.

18. The method of claim 17, further comprising controlling the reverse bias voltage during the second mode of operation in order to control a sensitivity of the SPAD when in the second mode of operation.

19. A system comprising:
    a single-photon avalanche diode (SPAD);
    control circuitry coupled to the SPAD and configured to:
       operate the SPAD in a first mode to determine a light intensity level associated with the SPAD;
       operate the SPAD in a second mode wherein a reverse bias voltage is applied in the second mode to bias the SPAD beyond its breakdown voltage, such that the SPAD operates in a detection mode; and
       determine a magnitude of the bias voltage applied to the SPAD in the second mode based on the light intensity level determined in the first mode.

20. The system of claim 19, wherein operating the SPAD in the first mode comprises reverse biasing the SPAD in a linear region of operation of the SPAD.

21. The system of claim 20, wherein reverse biasing the SPAD in the first mode of operation of the SPAD comprises applying the reverse bias voltage having a magnitude lower than a breakdown voltage of the SPAD.

22. The system of claim 19, wherein determining the light intensity level associated with the SPAD comprises:
    integrating with respect to time a current flowing through the SPAD during the first mode; and
    determining the light intensity level based on the integration of the current.

23. The system of claim 22, wherein the control circuitry is further configured to integrate the current flowing through the SPAD over a defined time period equal or greater to a longest round-trip delay of a photon to be detected by the SPAD.

24. The system of claim 19, wherein the magnitude of the bias voltage applied during the second mode of operation is inversely proportional to the light intensity level determined in the first mode of operation.

25. The system of claim 19, wherein the control circuitry is further configured to determine the bias voltage applied during the second mode of operation from a lookup table indexed by light intensity level determined in the first mode of operation.

26. The system of claim 19, wherein the SPAD is coupled to a light-emitting device of a known wavelength and a known light intensity level, and the control circuitry is further configured to:

measure a time-of-flight of a pulse from the light-emitting device during the second mode of operation; and determine a distance to an object based on the time-of-flight.

27. The system of claim 26, wherein measuring the time-of-flight of the pulse is based on an occurrence of a current avalanche of the SPAD during the second mode of operation.

28. The system of claim 19, wherein the SPAD is coupled to a light-emitting device of a known wavelength and a known light intensity level, and the control circuitry is further configured to:

compare the light intensity level determined in the first mode with the known light intensity level; and generate an indication if the light intensity level determined in the first mode exceeds the known light intensity level.

29. The system of claim 28, wherein the indication comprises one of a warning flag or an error message indicating that ambient light conditions do not allow for accurate detection of light in the second mode of operation.

30. The system of claim 19, wherein the SPAD is coupled to a light-emitting device of a known wavelength and a known light intensity level, and the control circuitry is further configured to:

compare the light intensity level determined in the first mode with the known light intensity level;

determine a distance to an object in the second mode of operation; and determine a reflectivity of the object based on the comparison and the distance.

31. The system of claim 30, wherein the control circuitry is further configured to calculate an attenuation factor which is a function of the distance.

32. The system of claim 31, wherein the reflectivity of the object is calculated based on the following relationship:

$$\text{(Reflectivity of Object)} = \frac{\text{(Received Light Intensity)}}{\text{(Transmitted Light Intensity)} \cdot \text{(Attenuation Factor that is a function of Distance)}}.$$

33. The system of claim 19, wherein the control circuitry is further configured to apply a reduced reverse bias voltage to the SPAD after an avalanche event has occurred in the SPAD.

34. The system of claim 33, wherein the reduced reverse bias voltage is approximately equal to a breakdown voltage of the SPAD.

35. The system of claim 19, wherein:

the reverse bias voltage during the first mode of operation is lower than a reverse breakdown voltage of the SPAD in order to operate the SPAD in a reverse-biased linear region of the SPAD; and the reverse bias voltage during the second mode of operation is greater than the breakdown voltage.

36. The system of claim 35, wherein the control circuitry is further configured to control the reverse bias voltage during the second mode of operation in order to control a sensitivity of the SPAD when in the second mode of operation.

* * * * *